US006669380B1

United States Patent
Cartoni

(10) Patent No.: US 6,669,380 B1
(45) Date of Patent: Dec. 30, 2003

(54) MODULE FOR ADJUSTMENT OF MOVEMENT INTENSITY, PARTICULARLY FOR A SUPPORT HEAD FOR TELEVISION OR MOTION-PICTURE CAMERAS

(75) Inventor: Guido Cartoni, Rome (IT)

(73) Assignee: Cartoni , S.p.A., Rome (IT)

( * ) Notice: Subject to any disclaimer, the term of this patent is extended or adjusted under 35 U.S.C. 154(b) by 0 days.

(21) Appl. No.: 09/352,884

(22) Filed: Jul. 14, 1999

(30) Foreign Application Priority Data

Jul. 29, 1998 (IT) .................................... 98-A/000507

(51) Int. Cl.$^7$ ................................................ G03B 17/02
(52) U.S. Cl. ..................... 396/428; 248/183.1; 352/243
(58) Field of Search ....................... 396/419, 428; 248/177.1, 178.1, 183.1; 352/243

(56) References Cited

U.S. PATENT DOCUMENTS 4,955,568 A  *  9/1990  O'Connor et al. ....... 248/183.3
5,389,972 A  *  2/1995  Cartoni ........................ 348/373
6,176,783 B1 *  1/2001  Lindsay et al. ............... 464/24
6,550,726 B1 *  4/2003  Cartoni ..................... 248/187.1

* cited by examiner

Primary Examiner—David Gray
(74) Attorney, Agent, or Firm—Smith, Gambrell & Russell, LLP

(57) ABSTRACT

The invention relates to a module for adjustment of movement intensity, particularly for a support head for television or motion-picture cameras, comprising a first outer disc-shaped element block (1) and a second inner disc-shaped element block (2), said second block (2) being centrally placed within a seat provided in said first block (1), and being movable with respect to said first block (1), in such a way to offset the respective axis, the disc-shaped elements of the first outer block (1) interposing between the disc-shaped elements of the second block (2) during the respective movement of the two blocks, said first and second blocks being placed inside a waterproof housing, and within said waterproof housing a fluid being provided.

7 Claims, 3 Drawing Sheets

MODULE FOR ADJUSTMENT OF MOVEMENT INTENSITY, PARTICULARLY FOR A SUPPORT HEAD FOR TELEVISION OR MOTION-PICTURE CAMERAS

The present invention relates to a module for adjustment of movement intensity, particularly for a support head for television or motion-picture cameras.

More specifically, the invention concerns a module of the above kind allowing to obtain an optimum adjustment of the movements.

Modules for the adjustment of the movement intensity on the horizontal or vertical plane are already available on the market, which are used for shot means in the movies and TV fields, said modules being based on the action of a fluid, particularly a silicone fluid, provided between movable disc-shaped elements.

They are particular solutions wherein the movement of concentric discs modifies the pressure exerted on the fluid, and consequently the resistance imposed on the head movement along the horizontal plane.

Even permitting a good functionality, said solutions do not allow to have an optimum adjustment in any situation.

Recently, solutions have been suggested, said solutions providing sector discs or reeds, interengaging during their movement, with a transmigration of the silicone fluid through the reeds, in order to improve the action of the silicone fluid.

Main object of the present invention is that of providing a solution able to improve the performances obtainable with the already available devices, thus obtaining an optimum adjustment of the head along the horizontal and/or vertical plane.

Another object of the present invention is that of providing a technical solution allowing a movement without vibrations and discontinuities, both along the horizontal and vertical planes, by the adjustment of the reaction intensity of a silicone fluid.

It is therefore specific object of the present invention a module for adjustment of movement intensity, particularly for a support head for television or motion-picture cameras, comprising a first outer disc-shaped element block and a second inner disc-shaped element block, said second block being centrally placed within a seat provided in said first block, and being movable with respect to said first block, in such a way to offset the respective axis, the disc-shaped elements of the first outer block interposing between the disc-shaped elements of the second block during the respective movement of the two blocks, said first and second blocks being placed inside a waterproof housing, and within said waterproof housing a fluid being provided.

Preferably, according to the invention, said disc-shaped elements of said first and second blocks have a plurality of holes for the passage of the fluid.

Still according to the invention, said first block preferably provides a central hole wherein said second disc-shaped element block is housed.

Always according to the invention, said fluid is preferably a high viscosity silicone fluid.

The present invention will be now described, for illustrative but not limitative purposes, according to its preferred embodiments, with particular reference to the figures of the enclosed drawings, wherein.

Figure 1:
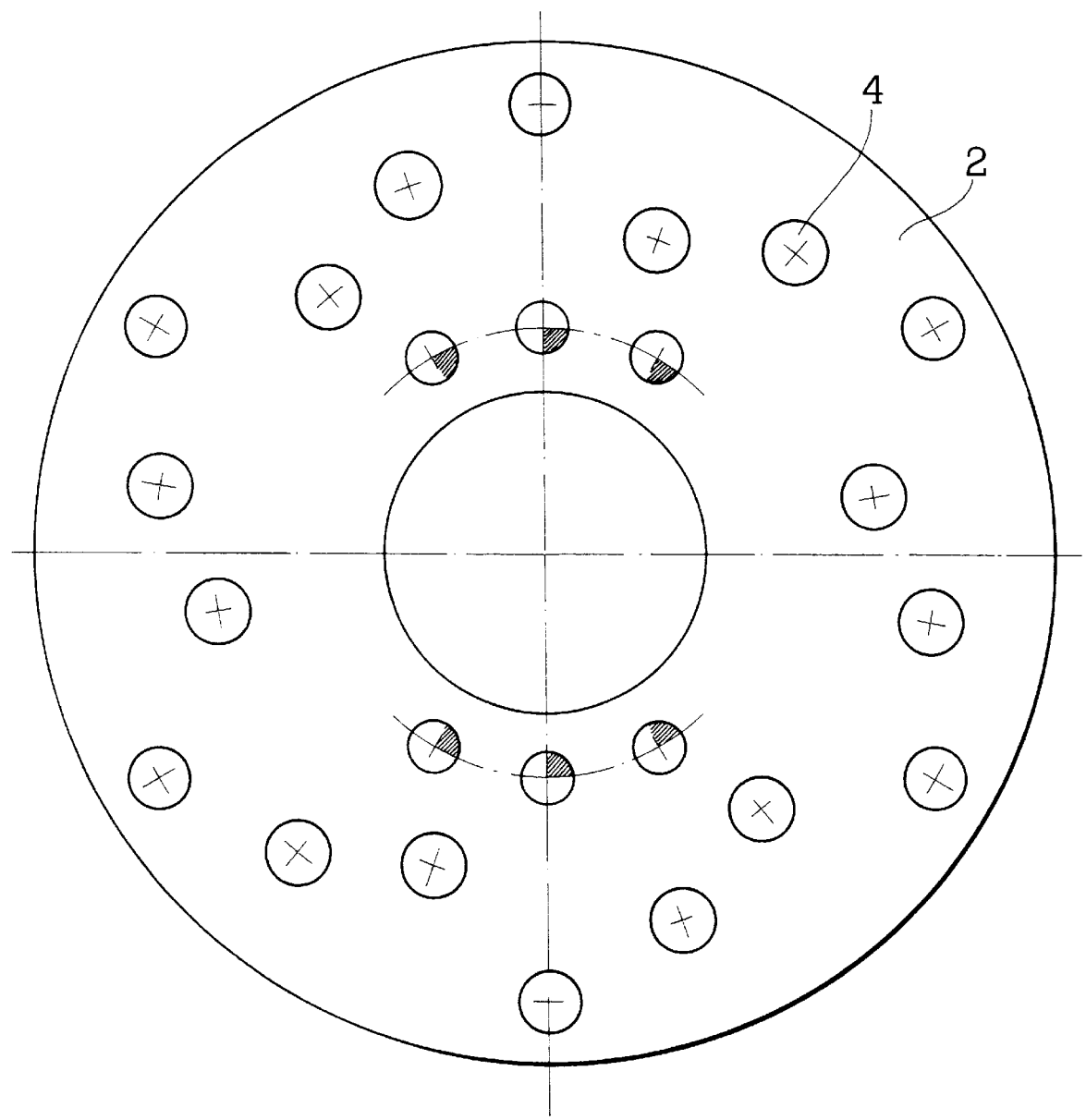
FIG. 1 shows the inner element of the adjustment module according to the present invention.
Figure 2:
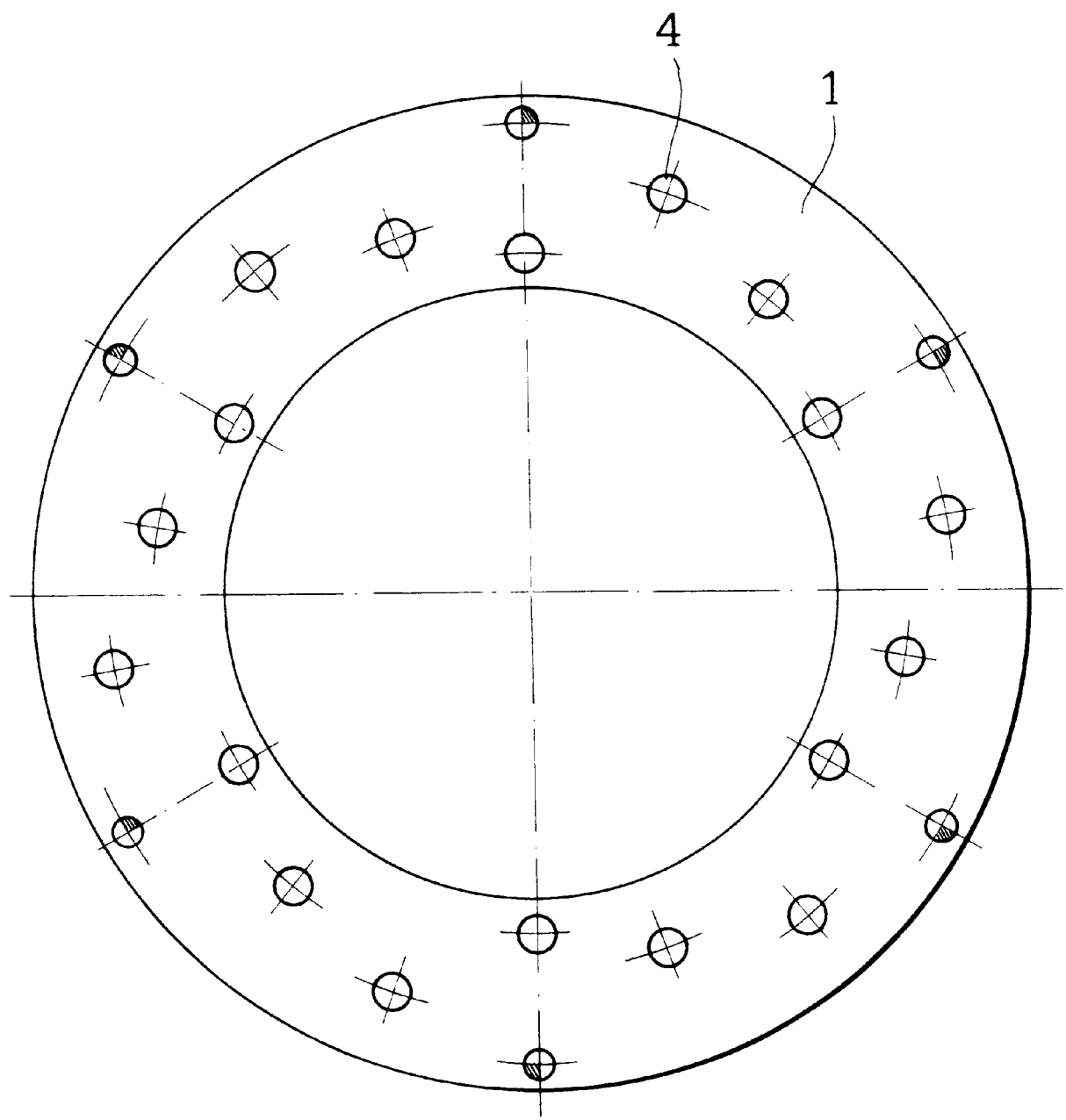
FIG. 2 shows the outer element of the adjustment module according to the present invention.

Observing now the figures of the enclosed drawings, it can be noted that the module according to the invention comprises a series of circular discs 1 (FIG. 2) realising a rigid block, in the cavity of which another block comprising laminar elements 2 (FIG. 1) is placed, said laminar elements 2 being able to interface with the elements of the outer block.

Figure 3:
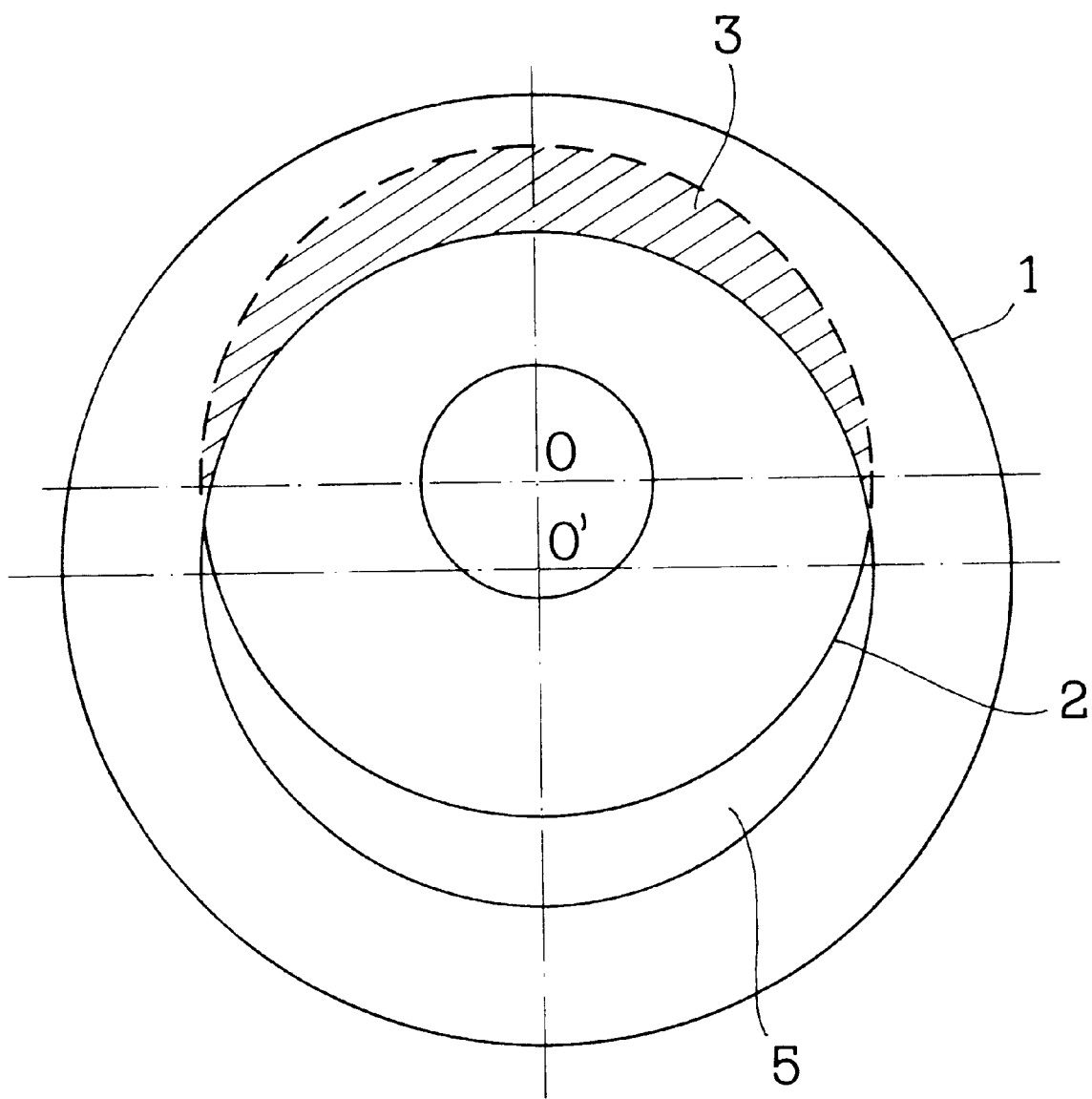
FIG. 3 schematically shows the operation principle of the module according to the present invention.

The adjustment of the module according to the invention comprises the displacement of the inner laminar element 2 block diametrically with respect to the disc 1 outer block, as shown in FIG. 3.

Both blocks 1 and 2 are provided within a waterproof room (not shown), which is completely filled in with fluid; to obtain a movement without discontinuities, a perfect movability of the fluid must be ensured, both within the waterproof room and within the laminar interfacing zone indicated by hatched lines and the reference number 3 in FIG. 3.

Consequently, each disc 2 of the inner block is bevelled according to the thickness direction along the inner diameter.

In this way, the flowing of the fluid among the different reeds is promoted.

Furthermore, holes 4 are realised both on the discs 1 and on the discs 2, in such a way that during the fluid charging phase and during the operation of the module according to the invention, the passage of the fluid according to an axial direction with respect to the discs 1 and 2 is facilitated.

By the solution according to the present invention, two different kind of phenomenon are obtained concerning the reaction of the silicone fluid.

First of all, an effect due to the interfacing of the surfaces of the elements 1 and 2 comprising the two blocks is obtained, so that, when the module is moved, the high density silicone fluid film between the reeds 1 and 2 is subjected to a molecular "stretching", thus determining the desired fluid reaction.

Furthermore, always during the motion of the mechanism, an effect is obtained due the pumping occurring in that amount of fluid in a position back to the central block (see FIG. 3) that, pushed by the planetary motion of the module according to the invention, determines a further contribution to the intensity of fluid reaction and ensures an optimum mixing of the same fluid.

In FIG. 3, distance OO' is the distance between the rotation centres of the two laminar blocks 1 and 2.

Displacement of the inner block 2 according to a diametrical direction with respect to the outer block 1 will involve a fluid resistance increase or reduction to the motion for the combination of the two above mentioned effects, in function of the interfaced surface and of the amount of fluid subjected to the pumping effect is increase or reduced.

Thus, an almost linear characteristic is obtained varying the distance between the rotation centres of the two laminar blocks 1 and 2.

The module according to the invention will have a perfectly identical behaviour both for horizontal and vertical movement. However, it is possible to suppose the loading of a fluid having a different density, allowing the differentiation of the use fields as far as the intensity level of the fluid reaction is concerned.

The drawings of the discs comprising the two laminar blocks (inner and outer) are enclosed, said blocks being employed in the "planetary" module for dampening in the horizontal and vertical plane.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Module for adjustment of movement intensity, particularly for a support head for television or motion-picture cameras, characterised in that it comprises a first outer disc-shaped element block and a second inner disc-shaped element block, said second block being centrally placed within a seat provided in said first block, and being movable with respect to said first block, in such a way to offset the respective axis, the disc-shaped elements of the first outer block interposing between the disc-shaped elements of the second block during the respective movement of the two blocks, said first and second blocks being placed inside a waterproof housing, and within said waterproof housing a fluid being provided.

2. Module according to claim 1, characterised in that said disc-shaped elements of said first and second blocks have a plurality of holes for the passage of the fluid.

3. Module according to claim 2, characterised in that said first block provides a central hole wherein said second disc-shaped element block is housed.

4. Module according to claim 3, characterised in that said fluid is a high viscosity silicone fluid.

5. Module according to claim 1, characterized in that said first block provides a central hole wherein said second disc-shaped element block is housed.

6. Module according to claim 1, characterized in that said fluid is a high viscosity silicone fluid.

7. Module according to claim 2, characterized in that said fluid is a high viscosity silicone fluid.

* * * * *